(12) United States Patent
Tomiyasu (10) Patent No.: US 9,781,680 B2
(45) Date of Patent: Oct. 3, 2017

(54) TERMINAL APPARATUS, COMMUNICATION SYSTEM, COMMUNICATION METHOD FOR TRANSMITTING THE MEASURED POSITIONAL INFORMATION

(71) Applicant: JVC KENWOOD Corporation, Yokohama (JP)

(72) Inventor: Emi Tomiyasu, Yokohama (JP)

(73) Assignee: JVC KENWOOD Corporation, Yokohama-shi (JP)

(*) Notice: Subject to any disclaimer, the term of this patent is extended or adjusted under 35 U.S.C. 154(b) by 279 days.

(21) Appl. No.: 14/636,855

(22) Filed: Mar. 3, 2015

(65) Prior Publication Data

US 2015/0282090 A1  Oct. 1, 2015

(30) Foreign Application Priority Data

Mar. 28, 2014 (JP) ................ 2014-068820

(51) Int. Cl.
*H04W 52/02* (2009.01)
*H04W 4/02* (2009.01)
*H04W 88/04* (2009.01)

(52) U.S. Cl.
CPC ....... *H04W 52/0261* (2013.01); *H04W 4/025* (2013.01); *H04W 88/04* (2013.01); *Y02B 60/50* (2013.01)

(58) Field of Classification Search
CPC .. H04W 52/0261; H04W 4/025; H04W 88/04
USPC ........................................... 370/311
See application file for complete search history.

(56) References Cited

U.S. PATENT DOCUMENTS

| | | | |
|---|---|---|---|
| 6,987,975 B1* | 1/2006 | Irvin | H04W 4/02 455/41.2 |
| 9,008,649 B2* | 4/2015 | Hidaka | H04W 40/24 370/338 |
| 2002/0086681 A1* | 7/2002 | Gilham | G08G 1/0104 455/456.6 |

(Continued)

FOREIGN PATENT DOCUMENTS

JP  2012-227781 A  11/2012

*Primary Examiner* — Stephen J Clawson
(74) *Attorney, Agent, or Firm* — Venable LLP; Michael A. Sartori; Miguel A. Lopez (57) ABSTRACT

A collection unit collects the identification information on each terminal apparatus and the remaining amount information on a remaining amount of battery by having each terminal apparatus mutually communicate the identification information on each terminal apparatus and the remaining amount information on the remaining amount of battery by way of a second communication unit. The collection unit also collects the identification information on its own terminal apparatus and the remaining amount information on the remaining amount of battery of the own terminal apparatus. A selector selects a single terminal apparatus, based on the remaining amount information collected. When the selector selects the own terminal apparatus, the positional information on the own terminal is acquired and the acquired positional information and the identification information collected by the collection unit are transmitted by the first communication unit to the base station apparatus.

4 Claims, 5 Drawing Sheets (56) References Cited

U.S. PATENT DOCUMENTS

| | | | | |
|---|---|---|---|---|
| 2010/0137023 A1* | 6/2010 | Chishima | .......... | H04W 52/0261 |
| | | | | 455/552.1 |
| 2010/0190505 A1* | 7/2010 | Shiizaki | ............ | H04W 52/0261 |
| | | | | 455/452.1 |
| 2011/0210848 A1* | 9/2011 | Howard | ............. | G08B 21/0247 |
| | | | | 340/539.32 |
| 2012/0173901 A1* | 7/2012 | Soliman | .............. | H04W 88/182 |
| | | | | 713/320 |
| 2012/0282961 A1* | 11/2012 | Bienas | .................. | H04W 24/00 |
| | | | | 455/507 |
| 2013/0015913 A1* | 1/2013 | Horikawa | ............. | G06F 1/3212 |
| | | | | 327/538 |

\* cited by examiner

| APPARATUS ID | REMAINING AMOUNT INFORMATION |
|---|---|
| A1 | B1 |
| A2 | B2 |
| AZ | BZ |

TERMINAL APPARATUS, COMMUNICATION SYSTEM, COMMUNICATION METHOD FOR TRANSMITTING THE MEASURED POSITIONAL INFORMATION

CROSS-REFERENCE TO RELATED APPLICATION

This application is based upon and claims the benefit of priority from the prior Japanese Patent Application No. 2014-68820, filed on Mar. 28, 2014, the entire contents of which are incorporated herein by reference.

BACKGROUND

1. Field

The present invention relates to a communication technique, and it particularly relates to a terminal apparatus, a communication system, and a communication method for transmitting the measured positional information.

2. Description of the Related Art

Since a mobile communication terminal such as a portable telephone is generally driven by a battery, it is desired that an access time to a mobile communication network be prolonged by suppressing the electric power consumed by the mobile communication terminal. For this reason, a plurality of mobile communication terminals mutually relay data between them using a short-range communication scheme, where a lower power is consumed than that consumed when access is made to the mobile communication network, and a mobile communication terminal having the largest remaining amount of battery accesses the mobile communication network, instead of the other mobile communication terminals.

Where a mobile communication terminal is equipped with a global positioning system (GPS) receiver, the positional information may sometimes be measured by the mobile communication terminal itself. The mobile communication terminal transmits the thus measured positional information via the mobile communication network. A position management system, which manages the positions of mobile communication terminals, collects a plurality of pieces of positional information measured by the plurality of mobile communication terminals via the mobile communication network and thereby manages the positions of the respective mobile communication terminals.

Since each mobile communication terminal transmits the positional information on a timely basis, the traffic amount in the mobile communication network increases. Measurement of positions by the GPS receivers also consumes the batteries of the mobile communication terminals. As a result, the access time to the mobile communication network is reduced.

SUMMARY

The present invention has been made in view of the foregoing circumstances, and a purpose thereof is to provide a technology for suppressing an increase in the electric power consumed even when the positional information is measured.

In order to resolve the foregoing problems, a terminal apparatus according to one embodiment of the present invention includes: a positioning unit that acquires positional information; a first communication unit that carries out communication compatible with a first radio communication system, for the purpose of transmitting the positional information acquired by the positioning unit to a base station apparatus; a second communication unit that carries out communication compatible with a second radio communication system having a shorter maximum transmission distance than that of the first radio communication system in the first communication unit; a collection unit that collects identification information on each terminal apparatus and remaining amount information on a remaining amount of battery by having each terminal apparatus mutually communicating the identification information on each terminal apparatus and the remaining amount information on the remaining amount of battery thereof by way of the second communication unit, and that collects the identification information on own terminal apparatus and the remaining amount information on the remaining amount of battery of the own terminal apparatus; and a selector that selects a single terminal apparatus, based on the collected remaining amount information. When the selector selects the own terminal apparatus, the positional information on the own terminal apparatus is acquired and the acquired positional information and the identification information collected by the collection unit are transmitted by the first communication unit to the base station apparatus.

Another embodiment of the present invention relates to a communication system. The communication system includes a plurality of terminal apparatuses. Each of the plurality of terminal apparatuses includes: a positioning unit that acquires positional information; a first communication unit that carries out communication compatible with a first radio communication system, for the purpose of transmitting the positional information acquired by the positioning unit to a base station apparatus; and a second communication unit that carries out communication compatible with a second radio communication system having a shorter maximum transmission distance than that of the first radio communication system in the first communication unit. The plurality of terminal apparatuses mutually communicate identification information on each terminal apparatus and remaining amount information on the remaining amount thereof by way of the second communication unit, and thereby collects the identification information on each terminal apparatus and the remaining amount of battery thereof together with the identification information on the own terminal apparatus and the remaining amount information on the remaining amount of battery of the own terminal apparatus; and, among the plurality of terminal apparatuses, a single terminal apparatus is selected based on the remaining amount information on the remaining amount of battery of the own terminal apparatus and the remaining amount information on the remaining amounts of battery of the rest of terminal apparatuses, and the selected signal terminal apparatus transmits the positional information acquired by the positioning unit and the collected identification information thereon by way of the first communication unit.

Still another embodiment of the present invention relates to a communication method. The communication method includes: acquiring positional information; carrying out communication compatible with a first radio communication system, for the purpose of transmitting the acquired positional information to a base station apparatus; carrying out communication compatible with a second radio communication system having a shorter maximum transmission distance than that of the first radio communication system; collecting, by way of the second communication system, remaining amount information on remaining amounts of battery from the other terminal apparatuses and selecting a single terminal apparatus based on remaining amount information on a remaining amount of battery of the own terminal apparatus and the collected remaining amount information on the remaining amounts of battery; and acquiring, by the selected single terminal apparatus, the positional information and transmitting, by the selected single terminal, the acquired positional information and identification information on the terminal apparatuses, acquired when the remaining amount information of the remaining amounts of battery of the rest of terminal apparatuses is collected, to the base station apparatus by way of the first radio communication system.

Optional combinations of the aforementioned constituting elements, and implementations of the invention in the form of methods, apparatuses, systems, recording media, computer programs and so forth may also be practiced as additional modes of the present invention.

BRIEF DESCRIPTION OF THE DRAWINGS

Embodiments will now be described by way of examples only, with reference to the accompanying drawings, which are meant to be exemplary, not limiting and wherein like elements are numbered alike in several Figures in which.

DETAILED DESCRIPTION

The invention will now be described by reference to the preferred embodiments. This does not intend to limit the scope of the present invention, but to exemplify the invention.

An outline of the present invention will be first given before a specific description thereof. An embodiment of the present invention relates to a communication system where communications are carried out between a plurality of terminal apparatuses and a base station apparatus. Each terminal apparatus has a communication function capable of handling a mobile communication system and can communicate with the base station apparatus. Also, each terminal apparatus has a communication function for a short-range communication system and can communicate with other terminal apparatuses. Furthermore, each terminal apparatus has a receiving function for a GPS and can acquire positional information. Under these conditions, each terminal apparatus can transmit the measured positional information and information, by which to identify a terminal apparatus or terminal apparatuses, to the base station apparatus, whereas the base station apparatus can manage the positions of the terminal apparatuses, based on the positional information and the terminal apparatus identifying information. The terminal apparatus identifying information is identification information of a terminal apparatus, such as a unique ID and a user ID of the terminal apparatus. When these processes are added to the normal communication processes carried out between the terminal apparatus and the base station apparatus, the traffic volume in the communications with the base station apparatus increases. Also, the electric power consumed by the terminal apparatus increases and therefore the communication time is reduced. In order to suppress an increase in the traffic volume between the terminal apparatus and the base station apparatus, each terminal apparatus carries out the following processes.

Assume that a plurality of terminal apparatuses are located within a range where the communications are feasible by a short-range communication system. Then, the plurality of terminal apparatuses each measures the remaining amount of battery and communicates mutually with each other about the remaining amount of battery (hereinafter referred to as "battery remaining amount" also) and its own terminal apparatus ID by the short-range communication system. Note that the electric power consumed by the short-range communication system is smaller than that consumed by the mobile communication system and the GPS. Each terminal apparatus compares the collected battery remaining amounts, including the battery remaining amount of its own terminal apparatus and then selects a terminal apparatus having the maximum remaining amount of battery. If the selected terminal apparatus is the own terminal apparatus itself, the positional information of the own terminal apparatus is measured and then the measured positional information, the collected terminal apparatus ID and the terminal apparatus ID of the own terminal apparatus are transmitted to the base station apparatus. If the selected terminal apparatus is a terminal apparatus other the own terminal apparatus, the terminal apparatus does not carry out these processes. In other words, each terminal apparatus autonomously selected a terminal apparatus for which the positional information is to be transmitted.

Figure 1:
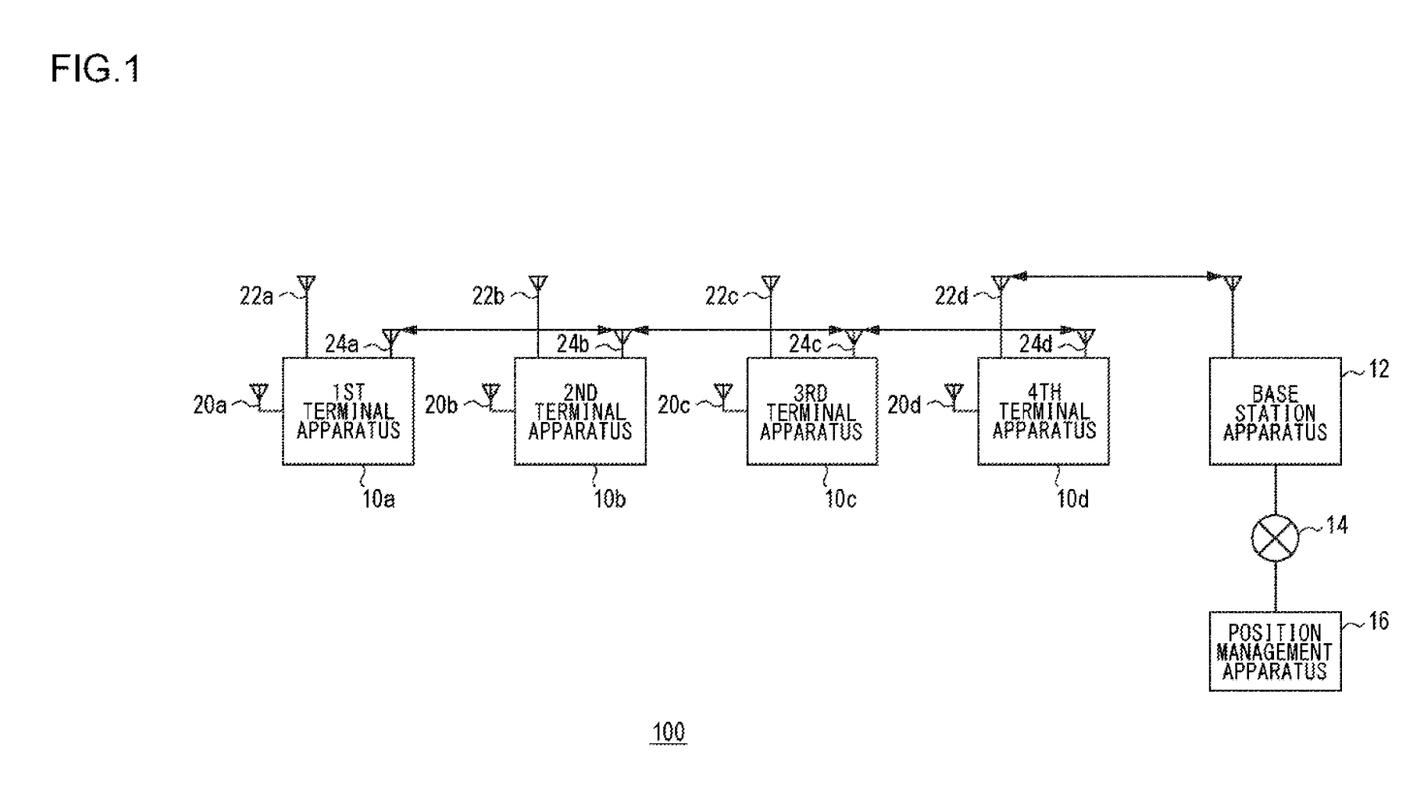
FIG. 1 shows a structure of a communication system according to an embodiment of the present invention.

FIG. 1 shows a structure of a communication system 100 according to a first exemplary embodiment of the present invention. The communication system 100 includes a first terminal apparatus 10a, a second terminal apparatus 10b, a third terminal apparatus 10c, a fourth terminal apparatus 10d, a base station apparatus 12, a network 14, and a position management apparatus 16. Hereinafter, the first terminal apparatus 10a, the second terminal apparatus 10b, the third terminal apparatus 10c, and the fourth terminal apparatus 10d are generically referred to as "terminal apparatus 10" or "terminal apparatuses 10". The first terminal apparatus 10a includes a first positioning antenna 20a, a first mobile communication antenna 22a, and a first short-range communication antenna 24a. The second terminal apparatus 10b includes a second positioning antenna 20b, a second mobile communication antenna 22b, and a second short-range communication antenna 24b. The third terminal apparatus 10c includes a third positioning antenna 20c, a third mobile communication antenna 22c, and a third short-range communication antenna 24c. The fourth terminal apparatus 10d includes a fourth positioning antenna 20d, a fourth mobile communication antenna 22d, and a fourth short-range communication antenna 24d. Hereinafter, the first positioning antenna 20a, the second positioning antenna 20b, the third positioning antenna 20c and the fourth positioning antenna 20d are generically referred to as "positioning antenna 20" or "positioning antennas 20". Similarly, the first mobile communication antenna 22a, the second mobile communication antenna 22b, the third mobile communication antenna 22c and the fourth mobile communication antenna 22d are generically referred to as "mobile communication antenna 22" or "mobile communication antennas 22". Similarly, the first short-range communication antenna 24a, the second short-range communication antenna 24b, the third short-range communication antenna 24c and the fourth short-range communication antenna 24d are generically referred to as "short-range communication antenna 24" or "short-range communication antennas 24".

Though four terminal apparatuses 10, which are the first terminal apparatus 10a to the fourth terminal apparatus 10d, are shown here as a plurality of terminal apparatuses 10, the number of the terminal apparatuses is not limited to "four". The plurality of terminal apparatuses 10 communicate with each other by the short-range communication system via the short-range communication antennas 24. A terminal apparatus ID is assigned to each terminal apparatus 10, so that each terminal apparatus is identified by the terminal apparatus ID. Each terminal apparatus 10 is also capable of measuring the position by GPS via the positioning antenna 20, and the positional information is acquired by measuring the position thereby. The measurement of the position may be performed when the selection described later is made and may not be performed until then. Further, each terminal apparatus 10 communicates with the base station apparatus 12 by the mobile communication system via the mobile communication antenna 22.

At one end of the base station apparatus 12, the base station apparatus 12 communicates with the plurality of terminal apparatuses 10 by the mobile communication system. The processing carried out by the base station apparatus 12 is a known technology and therefore the repeated description thereof is omitted here. At the other end thereof, the base station apparatus 12 connects to the network 14. Here, the base station apparatus 12 communicates with the position management apparatus 16 via the network 14. The position management apparatus 16 receives the positional information sent from the terminal apparatuses 10 and, at the same time, receives the terminal apparatus IDs with which to identify these terminal apparatuses 10. The position management apparatus 16 stores the terminal apparatus IDs and the positional information by associating the terminal apparatuses IDs with their positional information.

Each terminal apparatus 10, which is driven by a battery, acquires information on the remaining amount of battery (hereinafter referred to as "remaining amount information"), then communicates with each other about the remaining amount information and the terminal apparatus ID by using the short-range communication system, and thereby collects them together with its own terminal apparatus ID and remaining amount information. Each terminal apparatus 10 compares the remaining amounts of battery, based on the remaining information and then selects a single terminal apparatus 10 having the maximum remaining amount of battery. In other words, the terminal apparatus 10 having the maximum remaining amount of battery is selected by each terminal apparatus 10. A terminal apparatus 10 other than the terminal apparatus itself 10 is selected, the terminal apparatus 10 does not transmit its positional information to the base station apparatus 12. If the terminal apparatus itself 10 is selected, the terminal apparatus 10 acquires its own positional information and then transmits its own positional information of the selected terminal apparatus 10, the terminal apparatus IDs of the other terminal apparatuses 10 and its own terminal apparatus ID to the base station apparatus 12 by using the mobile communication system. The base station apparatus 12 receives the positional information and the terminal apparatus ID sent from the terminal apparatus 10 selected. The position management apparatus 16 stores the positional information and the terminal apparatus ID of the terminal apparatus 10 by associating the positional information with the terminal apparatus ID and, at the same time, stores the positional information of the terminal apparatus 10 in such a manner that this positional information of the terminal apparatus 10 is associated respectively with the other terminal apparatus IDs sent from this terminal apparatus 10.

Figure 2:
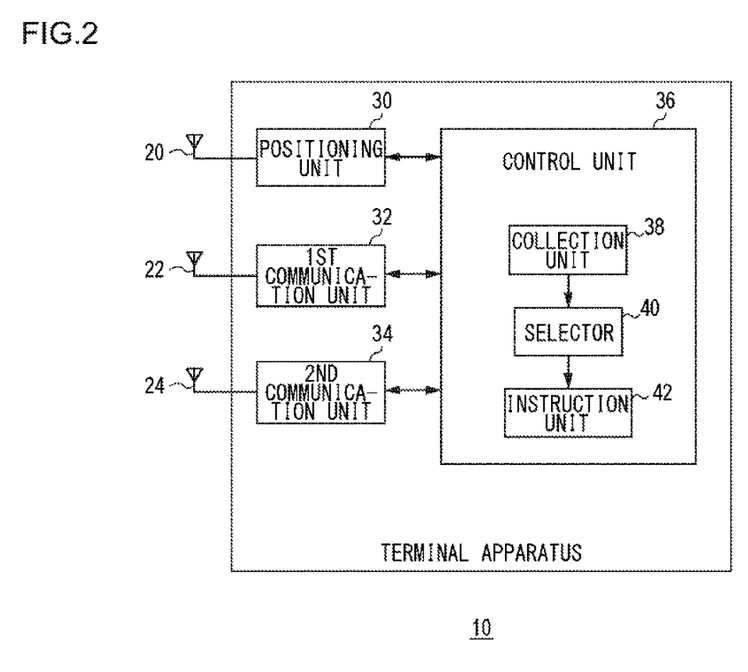
FIG. 2 shows a structure of a terminal apparatus shown in FIG. 1.

FIG. 2 shows a structure of a terminal apparatus 10. The terminal apparatus 10 includes a positioning antenna 20, a mobile communication antenna 22, a short-range communication antenna 24, a positioning unit 30, a first communication unit 32, a second communication unit 34, and a control unit 36. The control unit 36 includes a collection unit 38, a selector 40, and an instruction unit 42.

The positioning unit 30 receives signals from GPS satellites via the positioning antenna 20 and acquires positional information based on the received signals. A known technique besides the GPS technique may be used to acquire the positional information and therefore the repeated description thereof is omitted here. The positioning unit 30 outputs the thus acquired positional information to the control unit 36. The positioning unit 30 acquires the positional information on the condition that the positioning unit 30 receives an instruction from the control unit 36.

The first communication unit 32 communicates with the base station apparatus 12 via the mobile communication antenna 22. As discussed earlier, the communication carried out between the first communication unit 32 and the base station apparatus 12 corresponds to the mobile communication system. The mobile communication system is a third-generation mobile communication system, a fourth-generation mobile communication system, a wireless MAN (Metropolitan Area Network), or the like, for instance, which is a known technique, and therefore the repeated description thereof is omitted here.

The second communication unit 34 communicates with other terminal apparatuses 10 via the short-range communication antenna 24. Such a communication carried out with other terminal apparatuses 10 does not go through the base station apparatus 12 and therefore may be said to be an ad-hoc communication. As discussed earlier, the communication carried out between the second communication unit 34 and the other terminal apparatuses 10 corresponds to the short-range or local communication system. The short-range communication system is wireless PAN (Personal Area Network), wireless LAN (Local Area Network), or the like, for instance.

The former includes IrDA (Infrared Data Association), Bluetooth (registered trademark), UWB (Ultra Wide Band), Z-Wave, and ZigBee (registered trademark). In other words, the short-range communication system has a shorter maximum transmission distance than that of the mobile communication system. Thus, the electric power consumed by the second communication unit 34 is smaller than that consumed by the first communication unit 32. The second communication unit 34 transmits and receives a signal including a combination of the remaining amount information and the terminal apparatus ID.

The control unit 36 generates the remaining amount information and has the second communication unit 34 transmit the thus generated remaining amount information to the other terminal apparatuses 10. In response to this, the second communication unit 34 transmits the remaining amount information. The second communication unit 34 transmits the terminal apparatus ID, too. The collection unit 38 receives combinations of the remaining amount information and the terminal apparatus ID sent from the other terminal apparatuses 10, via the second communication unit 34. The collection unit 38 gathers a plurality of sets of combinations of the remaining amount information and the terminal apparatus IDs, for various terminal apparatus IDs.

Figure 3:
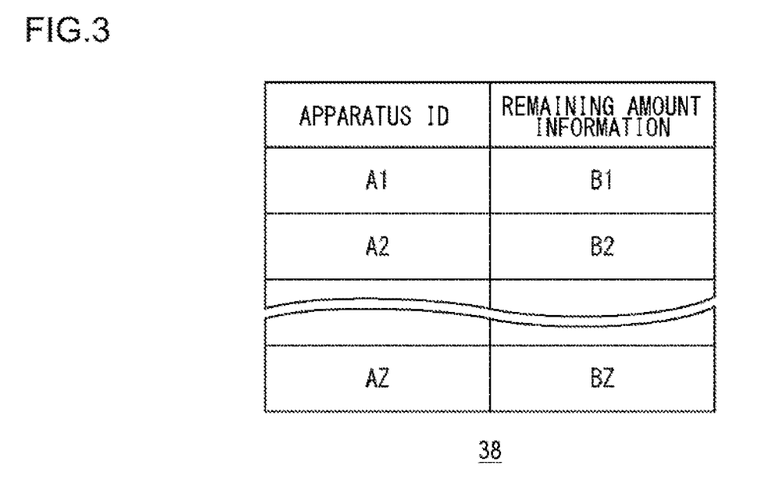
FIG. 3 shows a data structure of a data base generated in a collection unit shown in FIG. 1.

If a newly received terminal ID has turned out that it has already been received, the collection unit 38 updates the already-received remaining amount information with the newly received remaining amount information. FIG. 3 shows a data structure of a data base generated in the collection unit 38. As shown in FIG. 3, a plurality of items of remaining amount information associated respectively with a plurality of terminal apparatus IDs are stored. Now, refer back to FIG. 2. The data base includes the remaining amount information on its own terminal apparatus 10.

The selector 40 selects a single terminal apparatus 10, based on the plurality of items of remaining amount information that have been gathered and stored in the collection unit 38. The selector 40 selects a terminal apparatus 10 having the largest remaining amount of battery. If the selector 40 selects its own terminal apparatus 10, the instruction unit 42 instructs the positioning unit 30 to measure the position thereof and acquires the positional information from the positioning unit 30. Also, the instruction unit 42 acquires the terminal apparatus ID from the collection unit 38. Further, the instruction unit 42 has the first communication unit 32 transmit a notification that has compiled the terminal apparatus ID and the positional information. In response to this, the first communication unit 32 transmits the notification to the base station apparatus 12 by the mobile communication system. If, on the other hand, the selector 40 selects another terminal apparatus 10, namely if its own terminal apparatus is not selected, the instruction unit 42 does not transmits the notification to the first communication unit 32. If its own terminal apparatus is not selected, the positioning unit 30 may stop acquiring the positional information.

This structure may be implemented hardwarewise by elements such as a CPU, memory and other LSIs of an arbitrary computer, and softwarewise by memory-loaded programs or the like. Depicted herein are functional blocks implemented by cooperation of hardware and software. Therefore, it will be obvious to those skilled in the art that the functional blocks may be implemented by a variety of manners including hardware only, software only or a combination of both.

Figure 4:
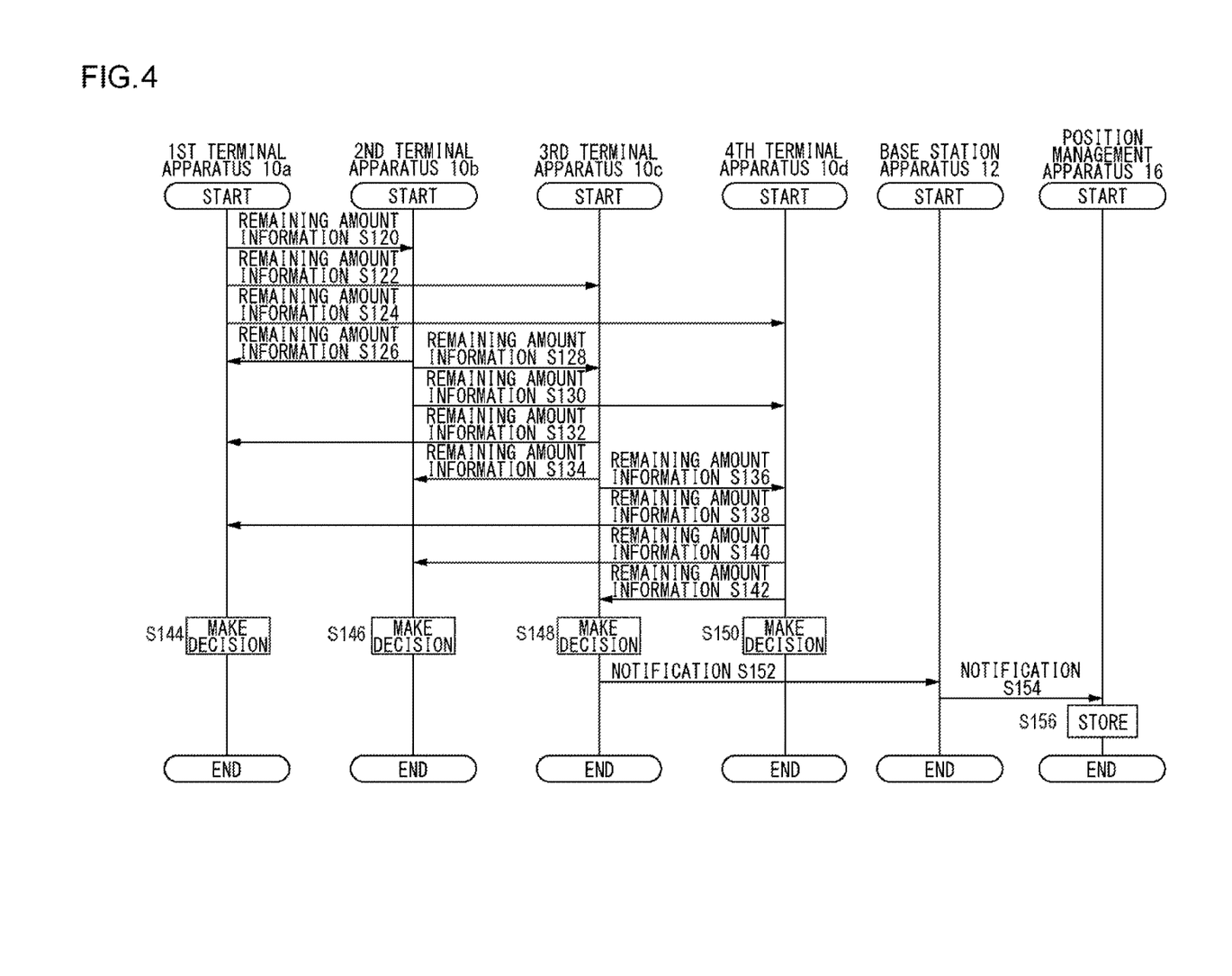
FIG. 4 is a sequence diagram showing a procedure of notification by the communication system shown in FIG. 1.

An operation of the communication system 100 as described above is now described. FIG. 4 is a sequence diagram showing a procedure of notification by a communication system 100 according to a second exemplary embodiment of the present invention. The first terminal apparatus 10a transmits the remaining amount information to the second terminal apparatus 10b (S120), transmits it to the third terminal apparatus 10c (S122), and transmits it to the fourth terminal apparatus 10d (S124). The second terminal apparatus 10b transmits the remaining amount information to the first terminal apparatus 10a (S126), transmits it to the third terminal apparatus 10c (S128), and transmits it to the fourth terminal apparatus 10d (S130).

The third terminal apparatus 10c transmits the remaining amount information to the first terminal apparatus 10a (S132), transmits it to the second terminal apparatus 10b (S134), and transmits it to the fourth terminal apparatus 10d (S136). The fourth terminal apparatus 10d transmits the remaining amount information to the first terminal apparatus 10a (S138), transmits it to the second terminal apparatus 10b (S140), and transmits it to the third terminal apparatus 10c (S142). The first terminal apparatus 10a makes decision (144), the second terminal apparatus 10b makes decision (146), the third terminal apparatus 10c makes decision (S148), and the fourth terminal apparatus 10d makes decision (S150). The third terminal apparatus 10c transmits a notification to the base station apparatus 12 (S152), and the base station apparatus, in turn, transmits the notification to the position management apparatus 16 (S154). The position management apparatus 16 stores the content of the notification (S156).

Figure 5:
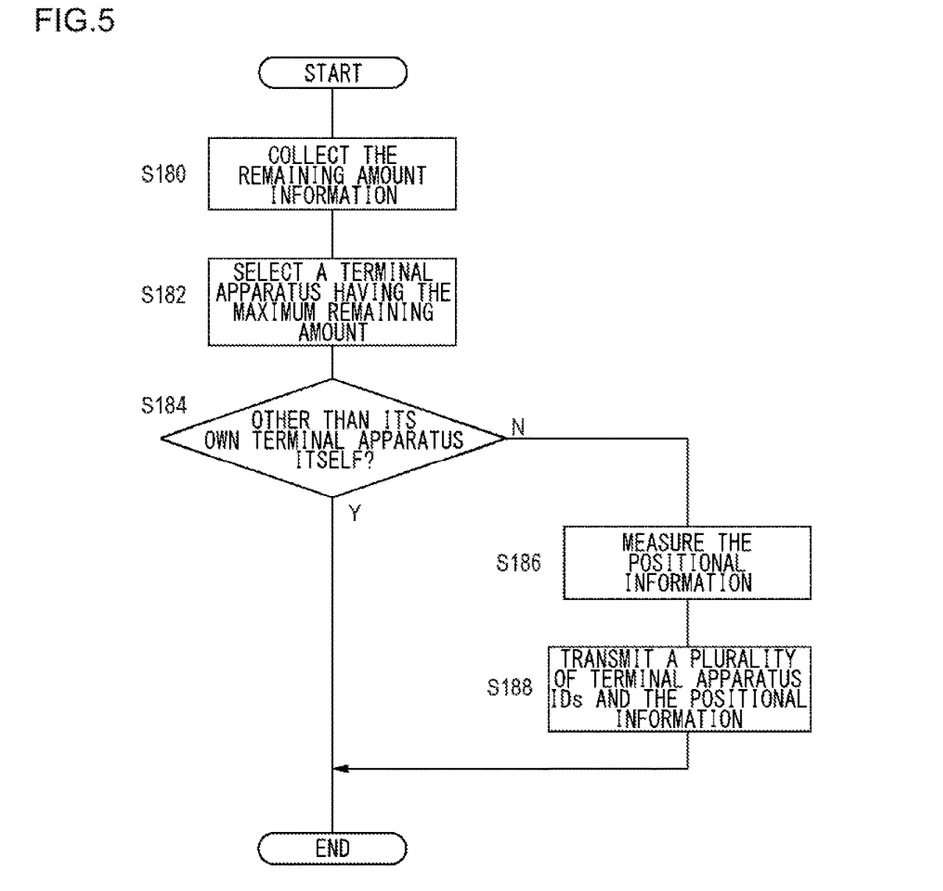
FIG. 5 is a flowchart showing an operation procedure by a terminal apparatus shown in FIG. 1.

FIG. 5 is a flowchart showing an operation procedure by a terminal apparatus 10 shown in FIG. 1. The collection unit 38 gathers the remaining amount information (S180). The selector 40 selects a terminal apparatus 10 having the maximum remaining amount (S182). If the selected terminal apparatus 10 is a terminal apparatus 10 other its own terminal apparatus (Y of S184), the processing is terminated. If, on the other hand, the selected terminal is its own terminal apparatus (N of S184), the positioning unit 30 measures the positional information (S186) and the first communication unit 32 transmits a plurality of terminal apparatus IDs and a plurality of items of the positional information to the base station apparatus 12 (S188).

By employing the exemplary embodiments of the present invention, the measurement of positional information and the subsequent transmission thereof can be eliminated if a terminal other than its own terminal apparatus is selected. Since the measurement of positional information and the subsequent transmission thereof are no longer required, the increase in the traffic volume resulting from the transmission of positional information in the mobile communication network can be suppressed. Since the measurement of positional information and the subsequent transmission thereof are no longer required, the increase in the electric power consumed can be suppressed. Since the increase in the power consumption is suppressed, a reduction in the operating time can be suppressed. Also, each terminal apparatus selects a single terminal apparatus on a common basis. Thus, even though each terminal apparatus carries out a selecting process independently of the other terminal apparatuses, the same terminal apparatus is still selected. Also, if no other terminal apparatuses is located in a communication range of the short-range communication system, namely even if the remaining amount information on the other terminal apparatuses is not obtained, the collection unit gathers the remaining amount information on its own terminal apparatus. Thus, its own terminal apparatus will be selected and then the positional information and the ID of its own terminal apparatus will be transmitted, so that each terminal can have an identical configuration with each other.

The description of the invention given above is based upon illustrative exemplary embodiments. These exemplary embodiments are intended to be illustrative only and it will be obvious to those skilled in the art that various other modifications to constituting elements and processes could be developed and that such modifications are also within the scope of the present invention.

What is claimed is:

1. A communication method for managing positions of a plurality of terminal apparatuses, comprising:
   acquiring positional information;
   carrying out communication compatible with a first radio communication system, for the purpose of transmitting positional information on own terminal apparatus to a management apparatus;
   carrying out communication compatible with a second radio communication system having a shorter maximum transmission distance than that of the first radio communication system;
   collecting, by way of the second communication system, remaining amount information on remaining amounts of battery from the other terminal apparatuses and autonomously selecting, from among the other terminal apparatuses and the own terminal apparatus, a single terminal apparatus based on remaining amount information on a remaining amount of battery of the own terminal apparatus and the collected remaining amount information on the remaining amounts of battery; and acquiring, by the autonomously selected single terminal apparatus, the positional information and transmitting, by the selected single terminal, the acquired positional information and identification information on the terminal apparatuses, acquired when the remaining amount information of the remaining amounts of battery of the rest of terminal apparatuses is collected, to the base station apparatus by way of the first radio communication system, wherein, when another terminal apparatus that is not the own apparatus is selected autonomously, the positional information acquired by own apparatus is not transmitted to the base station apparatus and the identification information collected by own apparatus is not transmitted to the base station apparatus.

2. A communication system including a plurality of terminal apparatuses and a management apparatus that manages positions of the plurality of terminal apparatuses, each of the plurality of terminal apparatuses including:
a first communication unit that carries out communication compatible with a first radio communication system with the management apparatus;
a second communication unit that carries out communication compatible with a second radio communication system having a shorter maximum transmission distance than that of the first radio communication system in the first communication unit with other terminal apparatuses,
a collection unit that collects identification information on the other terminal apparatuses and remaining amount information on a remaining amount of battery thereof by having the other terminal apparatuses mutually communicating the identification information on the other terminal apparatuses and the remaining amount information on the remaining amount of battery thereof by way of the second communication unit, and that collects the identification information on own terminal apparatus and the remaining amount information on the remaining amount of battery of the own terminal apparatus;
a selector that selects a single terminal apparatus autonomously from among the other terminal apparatuses and the own terminal apparatus, based on the remaining amount information on the other terminal apparatuses and the remaining amount information on the own terminal apparatus collected by the collection unit; and
a positioning unit that acquires positional information,
wherein, when the selector selects the own terminal apparatus autonomously, the positional information acquired by the positioning unit and the identification information collected by the collection unit are transmitted by the first communication unit to the management apparatus, and when the selector selects another terminal apparatus that is not the own apparatus autonomously, the positional information acquired is not transmitted to the management apparatus and the identification information collected by the collection unit is not transmitted to the management apparatus, the management apparatus stores the positional information transmitted from the selected single terminal apparatus and the identification information on the selected single terminal apparatus, mapping the information to each other, and stores the positional information transmitted from the selected single terminal apparatus and the identification information on the rest of the other terminal apparatuses transmitted from the selected single terminal apparatus, mapping the information to each other.

3. A terminal apparatus comprising:
a first communication unit that carries out communication compatible with a first radio communication system with a base station apparatus;
a second communication unit that carries out communication compatible with a second radio communication system having a shorter maximum transmission distance than that of the first radio communication system in the first communication unit with other terminal apparatuses;
a collection unit that collects identification information on the other terminal apparatuses and remaining amount information on a remaining amount of battery thereof by having the other terminal apparatuses mutually communicating the identification information on the other terminal apparatuses and the remaining amount information on the remaining amount of battery thereof by way of the second communication unit, and that collects the identification information on own terminal apparatus and the remaining amount information on the remaining amount of battery of the own terminal apparatus;
a selector that selects a single terminal apparatus autonomously from among the other terminal apparatuses and the own terminal apparatus, based on the remaining amount information on the other terminal apparatuses and the remaining amount information on the own terminal apparatus collected by the collection unit; and
a positioning unit that acquires positional information,
wherein, when the selector selects the own terminal apparatus autonomously, the positional information acquired by the positioning unit and the identification information collected by the collection unit are transmitted by the first communication unit to the base station apparatus, and when the selector selects another terminal apparatus that is not the own apparatus autonomously, the positional information acquired is not transmitted to the base station apparatus and the identification information collected by the collection unit is not transmitted to the base station apparatus.

4. The terminal apparatus according to claim 3, wherein, when the selector selects the own terminal apparatus autonomously, the positioning unit acquires the positional information, and, when the selector selects another terminal apparatus autonomously, the positioning unit does not acquire the positional information.

* * * * *